United States Patent Office 3,546,124
Patented Dec. 8, 1970

3,546,124
CLEANSING SOLUTIONS
Joseph Fleischer, 210 Yale Ave.,
New Haven, Conn. 06515
No Drawing. Continuation of application Ser. No. 504,138, Oct. 23, 1965. This application Nov. 18, 1968, Ser. No. 778,009
Int. Cl. C11d 7/32, 7/50; C23g 5/02
U.S. Cl. 252—153
7 Claims

ABSTRACT OF THE DISCLOSURE

Improved cleansing solutions, and method of use, for the rapid and effective residue-free removal of contaminants from glass, metal or other surfaces. The solution is formed by dissolving three types of volatile organic compounds in water: (1) a lower aliphatic or halosubstituted aliphatic acid, (2) an amine in substantially equivalent molar proportions, preferably in excess, with respect to the acid, and (3) a water-soluble oxygen-containing neutral solvent, e.g. an alcohol, ether, ether-alcohol, ketone or mixture thereof. All the organic ingredients should have normal boiling points between about 50° C. and 150° C. for use of the cleaner at ordinary temperatures, and up to about 275° C. for use at higher temperatures.

---

This is a continuation of application Ser. No. 504,138, filed Oct. 23, 1965, now abandoned.

This invention relates to improved cleansing solutions particularly adapted for the rapid and effective removal of soils and contaminants from surfaces such as glass, metals, porcelain, tile, marble and plastics and from smooth coatings as of paint, lacquer or varnish.

While many types of solutions have been proposed heretofore for cleaning surfaces, their use has generally been deficient in some respects.

In most instances, the prior solution have included insoluble or non-volatile ingredients, such as salts, abrasives or solid detergents, which remain on the surface, often as streaks, after other ingredients have vaporized. Streakiness has also resulted from the inadequate wetting of soil particles by the cleaning liquid. Also, prior art cleaners have often been characterized by components having unpleasant odor or irritating tendencies.

In accordance with the present invention, such deficiencies are overcome by the provision of aqueous cleansing solutions in which substantially the entire content is volatile under the conditions of use and which display effective wetting power toward a wide variety of soils and contaminants. The novel cleansing solutions enable the rapid and thorough removal of surface contaminants without streaking or leaving a solid residue thereon.

These desirable results are attained in accordance with this invention by the provision of aqueous solutions containing essentially a combination of three types of dissolved volatile organic compounds, as follows: (1) a lower aliphatic acid, (2) an amine, and (3) a water-soluble oxygen-containing neutral organic solvent consisting of an alcohol, a ketone, an ether, an ether-alcohol, or a mixture of two or more such solvents.

The amine and lower aliphatic acid are employed in substantially equimolar proportions, but preferably with the amine in excess. These two components are present in the solution partly in the form of an amine salt of the aliphatic acid, the proportion of which decreases with dilution. Such solutions display a substantial reduction in surface tension as compared with water and a further decrease in surface tension is effected on the addition of the solvent component. Furthermore, the presence of the varied types of organic compound provides versatile wetting power to such solutions, so that practically all soils generally encountered are readily wetted thereby and thus are easily removed from the surface to which they have become adhered.

It is further essential that these ingredients all be volatile so that no residue remains on the cleansed surface under the conditions of use.

When the cleansing is to be accomplished at ambient temperatures, the volatility of each ingredient should be at least of the same order as that of water. That is, the vapor pressure of each organic material should be about equal to that of water at the operating temperature and preferably is somewhat higher. Stated in another way, for such use suitable individual organic ingredients of the solution should have normal boiling points between about 50° C. and 150° C.

Ingredients of higher normal boiling point and of correspondingly lower vapor pressures are advantageous for use in operations carried out at temperatures above normal room temperatures, such as in the range of 30° C. to about 150° C. For such applications, organic components having normal boiling points up to about 275° C. may be employed advantageously.

The lower aliphatic acid component is selected from the normal or branched-chain saturated monobasic acids containing one to four carbon atoms or mixtures thereof. Of these, acetic acid and propionic acid are particularly adapted as the acid component in cleansing solutions intended for use at ambient temperatures. Compositions containing the other acids are suited for use at higher temperatures in closed or well-ventilated systems. Halogenated acids, as above defined, such as fluoro-, chloro-, and bromo-acetic acid or -propionic acid are suitable for solutions employed at elevated temperatures.

The amine component is selected from the saturated aliphatic amines containing two to ten carbon atoms or mixtures thereof, wherein the amine group is primary, secondary or tertiary and the alkyl group is unsubstituted or may have a hydroxyl or alkoxy group substituent. Also, saturated cycloaliphatic amino compounds such as cyclohexylamine and morpholine, which includes oxygen as a hetero atom, are effective.

Excellent results are obtainable by the use as amine component in solutions for operations at ambient temperatures of diethylamine, butylamine, piperidine, triethylamine, amylamine, dipropylamine, ethylenediamine, propylenediamine, morpholine, hexylamine, dimethylethanolamine, or cyclohexylamine, or mixtures of two or more thereof.

For such use, somewhat more amine should be added to the solution than is theoretically required to neutralize the acid component, as the solution is preferably maintained alkaline for best results. Generally, 5% to 25% molar excess of the amine component is used, but up to about 50% may be desirable at times. Generally, the amine and the acid components are selected or formulated so that they display approximately equal vapor pressures at the operating temperature. However, when the amine is of appreciably higher volatility than the acid, the molar excess of the amine is increased up to about 50% excess in order to accomplish the desired purpose of maintaining the solution alkaline until it is substantially completely vaporized. Such result is also facilitated by the vapor pressure lowering effect exerted by each of these components on the other.

Effective amino compounds of lower volatility which are effective for operations at higher temperatures are exemplified by one or more of the following: monoethanolamine, diethylethanolamine, isopropanolamine, aminoethylethanolamine, and diethylenetriamine.

The neutral organic solvent component of the solutions intended for use at ambient temperatures is selected from water-soluble oxygen-containing compounds exemplified by ethanol, propanol, isopropanol, dioxane, ethylene glycol mono-ethyl ether, acetone, and methyl ethyl ketone. For operations at higher temperatures, this component may be selected from less volatile compounds exemplified by ethylene glycol, propylene glycol, ethylene glycol mono-butyl ether, diethylene glycol mono-butyl ether, and diethylene glycol diethyl ether.

In compositions in accordance with the invention for household use at ambient temperatures, the amine component is preferably morpholine, cyclohexylamine, butylamine, or mixtures thereof. These amines are characterized by mild ammoniacal odor which is further reduced in solutions containing acetic or propionic acid, particularly when masked by the generally pleasant odor of the solvent.

The following examples and illustrative embodiments of solutions which are especially effective for household use at room temperatures, as in cleaning of windows, mirrors and smooth surfaces; the list proportions are given by weight.

| Example | Acid | Amine | Solvent | Water |
|---|---|---|---|---|
| 1 | 6 acetic | 9 morpholine | 15 isopropanol | 70 |
| 2 | do | 11 cyclohexylamine | 5 ethanol; 10 isopropanol; 5 acetone | 63 |
| 3 | 7.4 propionic | 10 morpholine | 15 isopropanol; 10 EMK [1] | 75 |
| 4 | 3 acetic; 4 propionic | 5 morpholine; 4 butylamine | 10 ethanol; 15 isopropanol | 50 |
| 5 | do | 5 morpholine; 2 butylamine; 3 cyclohexylamine | 20 isopropanol; 10 EGME [2] | 60 |
| 6 | 9 acetic | 15 butylamine | 5 isopropanol; 10 EMK; 10 EGME | 75 |
| 7 | 7.4 propionic | 5 morpholine; 6 cyclohexylamine | 10 ethanol; 5 EMK; 5 EGME | 65 |
| 8 | do | 6 morpholine; 2 butylamine; 2 cyclohexylamine | 25 isopropanol | 50 |
| 9 | 3 acetic; 4 propionic | 7 morpholine; 1 butylamine; 2 cyclohexylamine | 10 ethanol; 10 EMK; 5 EGME | 55 |
| 10 | do | 6 morpholine; 7 cyclohexylamine | 15 isopropanol; 10 EMK; 5 EGME | 50 |

[1] EMK is ethylmethylketone.
[2] EGME is ethylene glycol monoethyl ether.

In preparing the solution, the ingredients may be combined in any order. If the acid and amine components are combined first, there is an appreciable evolution of heat and frequently a cloudy fine precipitate is formed, both indicative of salt formation. A clear solution results on addition and mixing the solvent component and the water.

If desired, the addition of most of the water may be deferred until just prior to use. In this way, storage and shipping is simplified by the provision of the solution in concentrated form, which requires only the addition and mixing of the required proportion of water to be ready for use.

The highly concentrated solutions containing about 10% to 40% by weight of water may also advantageously be applied directly for the cleaning of very dirty surfaces. In such cases, the removal of most of the soil can be facilitated by adding a fine abrasive to the concentrated or dilute cleansing solution, for example, about 1% to 5% of a fine clay, pumice, bentonite, or infusorial or diatomaceous earth, applying with a cloth and wiping the surface therewith, followed by wiping with the clear solution and then rubbing dry with a clean cloth.

In addition to being readily applicable by cloth or other suitable applicator, the cleaning solutions of this invention may likewise be sprayed over the glass or other surface, and then wiped dry with a clean cloth. The thorough cleansing effect is indicated by frictional sounds, akin to screeching, as the surface is wiped. Following the operation, the surface is brilliantly clear and free of any smudges or streaks; windows which have been treated on both surfaces are completely transparent.

The cleaning solutions as above exemplified are also readily adaptable for spraying as aerosols from valved containers containing a suitable liquefied propellant such as chlorinated methanes or fluoro-chloromethanes or -ethanes.

The following examples are illustrative embodiments of cleansing solutions utilizing organic ingredients which are less volatile than those in the preceding examples, and adapted for use at atmospheric pressure and at temperatures above ambient, for example in the range of 30° C. to about 90° C.

| Example | Acid | Amine | Solvent | Water |
|---|---|---|---|---|
| 11 | 7.4 propionic | 6.2 MEA [1] | 10 ethylene glycol; 15 n-propanol | 50 |
| 12 | 9 butyric | 3 MEA; 7 DEA [2] | 10 ethylene glycol; 10 propylene glycol | 40 |
| 13 | 4.5 butyric; 4 fluoroacetic | 4 MEA; 6 DEA | 20 EGBE [3] | 60 |
| 14 | 3 butyric; 6 chloroacetic | 6 MEA; 4 morpholine | 10 n-propanol; 10 ethylene glycol; 5 EGEE [4] | 40 |
| 15 | 4 fluoracetic; 5 chloroacetic | 12 DEA; 3 MEA | 15 EGBE; 10 propylene glycol; 10 ethylene glycol | 50 |

[1] MEA=monoethanolamine.
[2] DEA=diethylethanolamine.
[3] EGBE=ethylene glycol monobutyl ether.
[4] EGEE=ethylene glycol monoethyl ether.

The solutions of the above fifteen examples may be used at elevated temperatures particularly for cleaning the surfaces of metal objects and metal powders. The removal of surface contaminants is facilitated by immersion of the objects in the hot solution for the required period of ½ hour to several hours, the period being shortened by operating at a higher temperature and by causing relative motion between the objects and the solution, as by stirring or circulating the solution.

The treatment may be effected by circulating hot condensed solution over the objects being cleaned, and cycling the solution to a distillation chamber, condenser, and back to the treating chamber, as in conventional extraction methods. Or, the cleaning may be accomplished by boiling the solution under reflux, in contact with the objects to be cleaned. When the solution has a vapor pressure exceeding atmospheric pressure at the temperature of treatment, the operation may be carried out in a closed system under pressure, the solution being drained from the objects after contaminants have been removed from the surfaces.

After residual solution has been vaporized, the metal surfaces have been freed of soil and contaminants. Metal powders which have been thus treated are readily sintered and become metallurgically bonded when subjected to suitable pressure and temperature under non-oxidizing conditions.

Use of the cleansing solutions as above described also facilitates the proper preparation of metal surfaces for bonding by electron beam welding or other welding or joining process wherein the presence of a flux is impractical or not desired.

For such treatment of metal surfaces or powders at elevated temperatures, the amine component and the acid component may advantageously be used in substantially equivalent proportions. At times, the acid may be present in 5% to 50% molar excess, as acid solutions will be advantageous in the removal of surface oxide. In the case of surface oxide on metals which is extremely difficult to remove, conventional treatments may first be applied and then a final treatment in accordance with this invention insures a clean contaminant-free surface.

In the compositions set forth in the above specific examples, the listed components may be replaced in part by other components as defined. While the organic components should be added in substantially the listed proportions, the water content may be varied within a wide range from about 10% to about 95% by weight. The organic acid component should be present to the extent of at least about 2% by weight and the amine component in substantially molar equivalency thereto. The organic solvent component is added in amounts ranging from substantially equal to the total weight of acid and amine components to about five times that total weight.

Certain of the disclosed components are effective cleansing solution ingredients, which should best be used in closed systems or under conditions providing good ventilation. This precaution applies in particular to formic and butyric acids, which are characterized as having unpleasant odors, and to polyamines, such as ethylene diamine and propylene diamine, which have been reported to be skin irritants.

In the compositions of this invention intended for use at ordinary room temperatures, a modification which may at times be advantageous is the addition of ammonia, preferably in the form of aqueous ammonium hydroxide, to supply the desired excess alkalinity. Accordingly, in this modification, sufficient aqueous ammonium hydroxide is added to the solution containing the organic acid and amine components, which are used in substantially equivalent proportions, and the solvent component so as to provide excess alkalinity equivalent to 0.05 to 0.50 mole of ammonia per mole of the total acid present in the solution.

It will be understood that accessory ingredients in minor proportions may likewise be added to the cleansing solutions such as for example a suitable dye or perfume. A slight proportion of dodecyl alcohol may be added for the purpose of retarding evaporation of the solution. Trace amounts of a silicone oil may likewise be present in order to impart water repellency to the cleaned surface.

What is claimed is:

1. A liquid aqueous cleansing solution consisting essentially of at least 2% by weight of an organic acid selected from the group consisting of saturated lower fatty acids and halosubstituted lower fatty acids, said fatty acids containing one to four carbon atoms:
   a saturated aliphatic amine, wherein the aliphatic moiety is selected from the group consisting of unsubstituted alkyl, alkoxyalkyl, and hydroxyalkyl radicals containing two to ten carbon atoms, said acid and amine being present in substantially equivalent molar proportions;
   at least one neutral water-soluble oxygen-containing organic solvent selected from the group consisting of an alcohol, an ether, an ether-alcohol, and a ketone in an amount at least equal in weight to the total of said acid and said amine; and substantially the balance water; each of the said ingredients having a normal boiling point of about 50° C to 275° C. and said solution being substantially free of nonvolatile ingredients.

2. A solution as set forth in Claim 1, wherein each ingredient has a normal boiling point of about 50° C. to 150° C.

3. A solution as set forth in claim 1, wherein said amine is selected from the group consisting of morpholine, cyclohexylamine, butylamine, and a mixture of at least two thereof.

4. A solution as set forth in claim 1, wherein said acid ingredient is acetic acid and said amine ingredient is morpholine.

5. A solution as set forth in claim 1, wherein the solution has an alkalinity corresponding to an excess of 0.05 to 0.50 mole of amine per mole of said acid.

6. A solution as set forth in claim 1, wherein the said acid component and the said amine component have approximately equal vapor pressures.

7. The process of cleansing surfaces comprising applying thereto an aqueous solution as set forth in claim 1, thereby transferring contaminants from said surface to said solution, and removing the said solution from the cleansed surface.

References Cited

UNITED STATES PATENTS

| | | | |
|---|---|---|---|
| 3,212,909 | 10/1965 | Leigh | 106—13 |
| 3,106,929 | 10/1963 | Friedrich | 134—38 |
| 2,955,047 | 10/1960 | Terry | 106—3 |
| 2,700,654 | 1/1955 | Holman | 252—118 |
| 2,386,106 | 10/1945 | Gangloff | 252—161 |
| 1,809,970 | 6/1931 | Holland et al. | 252—143 |
| 1,494,147 | 5/1924 | Braun | 252—143 |

OTHER REFERENCES

"Modern Glass Cleaners," by Milton A. Lesser, Soap and Sanitary Chemicals, September 1952, pp. 46–49 and 105–6.

LEON D. ROSDOL, Primary Examiner

D. L. ALBRECHT, Assistant Examiner

U.S. Cl. X.R.

252—158, 171